(12) United States Patent
Spilo et al.

(10) Patent No.: US 8,973,063 B2
(45) Date of Patent: Mar. 3, 2015

(54) METHOD AND SYSTEM FOR SYNCHRONIZATION OF DIGITAL MEDIA PLAYBACK

(75) Inventors: Michael Spilo, Greenwich, CT (US); Jonathan Daub, New York, NY (US)

(73) Assignee: NETGEAR, Inc., San Jose, CA (US)

( * ) Notice: Subject to any disclaimer, the term of this patent is extended or adjusted under 35 U.S.C. 154(b) by 152 days.

(21) Appl. No.: 13/385,186

(22) Filed: Feb. 6, 2012

(65) Prior Publication Data

US 2012/0144435 A1   Jun. 7, 2012

Related U.S. Application Data

(62) Division of application No. 11/155,002, filed on Jun. 15, 2005, now Pat. No. 8,190,680.

(51) Int. Cl.
*H04N 21/8547* (2011.01)
*H04N 5/775* (2006.01)
(Continued)

(52) U.S. Cl.
CPC .................. *H04N 5/775* (2013.01); *H04N 5/76* (2013.01); *H04N 5/765* (2013.01); *H04N 21/4305* (2013.01); *H04N 21/4307* (2013.01); *H04N 21/4325* (2013.01); *H04N 21/43615* (2013.01); *H04N 21/8455* (2013.01); *H04N 5/781* (2013.01); *H04N 5/85* (2013.01); *H04N 9/8042* (2013.01)
USPC .......................................................... 725/78

(58) Field of Classification Search
CPC ......... H04N 5/775; H04N 5/76; H04N 5/781; H04N 5/85; H04N 9/8042; H04N 21/4305; H04N 21/4307; H04N 21/4325; H04N 21/43615; H04N 21/8455

USPC ............................................................ 725/78
See application file for complete search history.

(56) References Cited

U.S. PATENT DOCUMENTS 4,453,259 A   6/1984 Miller
5,241,428 A * 8/1993 Goldwasser et al. ......... 386/235
(Continued)

OTHER PUBLICATIONS

An application-level QoS comparison of inter-destination synchronization schemes for continuous media multicasting, Nunome et al., IEEE Global Telecommunications Conference, vol. 7, 2003. pp. 3602-3608.*

(Continued)

*Primary Examiner* — Nasser Goodarzi
*Assistant Examiner* — Michael B Pierorazio
(74) *Attorney, Agent, or Firm* — Boyle Fredrickson, S.C.

(57) ABSTRACT

A system and method for synchronizing digital media playback at multiple digital media playback devices interconnected on a network is provided. A digital media playback device comprising a processor, a synchronization component, a timekeeper component and a digital media source performs synchronization processes to arrange for other players to begin playback at a predetermined position and time in the digital media signal. Synchronization is accomplished by processes which approximate the arrival time of a packet containing audio and/or video digital content across the network and instruct the playback devices as to when playback is to begin, and at what point in the streaming media content signal to begin playback. One method uses a time-stamp packet on the network to synchronize all players. Other methods utilize reiterative processes to narrow approximations of packet arrival time at each playback device.

10 Claims, 7 Drawing Sheets

(51) Int. Cl.
*H04N 5/76* (2006.01)
*H04N 5/765* (2006.01)
*H04N 21/43* (2011.01)
*H04N 21/432* (2011.01)
*H04N 21/436* (2011.01)
*H04N 21/845* (2011.01)
*H04N 5/781* (2006.01)
*H04N 5/85* (2006.01)
*H04N 9/804* (2006.01)

(56) References Cited

U.S. PATENT DOCUMENTS

| | | | |
|---|---|---|---|
| 5,329,320 A * | 7/1994 | Yifrach | 348/738 |
| 5,467,137 A * | 11/1995 | Zdepski | 375/240.29 |
| 5,486,864 A * | 1/1996 | Zdepski | 348/423.1 |
| 5,592,551 A * | 1/1997 | Lett et al. | 380/211 |
| 5,808,662 A | 9/1998 | Kinney et al. | |
| 6,169,843 B1 | 1/2001 | Lenihan et al. | |
| 6,215,774 B1 | 4/2001 | Knauerhase et al. | |
| 6,233,389 B1 * | 5/2001 | Barton et al. | 386/232 |
| 6,233,695 B1 * | 5/2001 | Ahn | 713/400 |
| 6,269,122 B1 | 7/2001 | Prasad et al. | |
| 6,300,863 B1 | 10/2001 | Cotichini et al. | |
| 6,341,278 B1 * | 1/2002 | Yamamoto et al. | 711/4 |
| 6,598,172 B1 | 7/2003 | VanDeusen et al. | |
| 6,611,537 B1 | 8/2003 | Edens et al. | |
| 6,622,171 B2 | 9/2003 | Gupta et al. | |
| 6,741,290 B1 * | 5/2004 | Wells | 348/512 |
| 6,985,966 B1 * | 1/2006 | Gupta et al. | 709/248 |
| 6,996,624 B1 * | 2/2006 | LeCroy et al. | 709/231 |
| 7,023,924 B1 * | 4/2006 | Keller et al. | 375/240.26 |
| 7,113,983 B1 | 9/2006 | Terada et al. | |
| 7,269,338 B2 | 9/2007 | Janevski | |
| 7,344,084 B2 * | 3/2008 | DaCosta | 235/472.01 |
| 7,712,125 B2 * | 5/2010 | Herigstad et al. | 725/141 |
| 7,987,491 B2 * | 7/2011 | Reisman | 725/112 |
| 2002/0056129 A1 * | 5/2002 | Blackketter et al. | 725/112 |
| 2002/0118199 A1 | 8/2002 | Mukherjee et al. | |
| 2003/0091322 A1 | 5/2003 | Van Der Schaar | |
| 2003/0135632 A1 * | 7/2003 | Vrzic et al. | 709/231 |
| 2004/0031058 A1 * | 2/2004 | Reisman | 725/112 |
| 2004/0226050 A1 * | 11/2004 | Matsuzaki et al. | 725/135 |
| 2004/0227855 A1 * | 11/2004 | Morel et al. | 348/512 |
| 2005/0028200 A1 * | 2/2005 | Sardera | 725/42 |
| 2005/0216731 A1 * | 9/2005 | Saito et al. | 713/153 |
| 2005/0249240 A1 * | 11/2005 | Boyce et al. | 370/469 |
| 2005/0262261 A1 * | 11/2005 | Deshpande | 709/231 |
| 2005/0288805 A1 | 12/2005 | Moore et al. | |
| 2006/0031914 A1 * | 2/2006 | Dakss et al. | 725/135 |
| 2006/0072596 A1 * | 4/2006 | Spilo et al. | 370/412 |
| 2006/0093317 A1 * | 5/2006 | Law et al. | 386/68 |
| 2006/0227796 A1 * | 10/2006 | Wei et al. | 370/412 |
| 2008/0134258 A1 * | 6/2008 | Goose et al. | 725/91 |
| 2010/0100917 A1 * | 4/2010 | Chiao et al. | 725/110 |
| 2010/0303100 A1 * | 12/2010 | Niamut et al. | 370/503 |
| 2012/0002111 A1 * | 1/2012 | Sandoval et al. | 348/521 |
| 2012/0079541 A1 * | 3/2012 | Pan | 725/62 |

OTHER PUBLICATIONS

Flow synchronization protocol, Escobar et al., IEEE/ACM Transactions on Networking, vol. 2, issue 2, 1994, p. 111-121.*

Douglas E. Comer, Internetworking with TCP/IP vol. 1: Principles, Protocols, and Architecture, pp. 123-138 (ed., Prentice-Hall 1995).

* cited by examiner

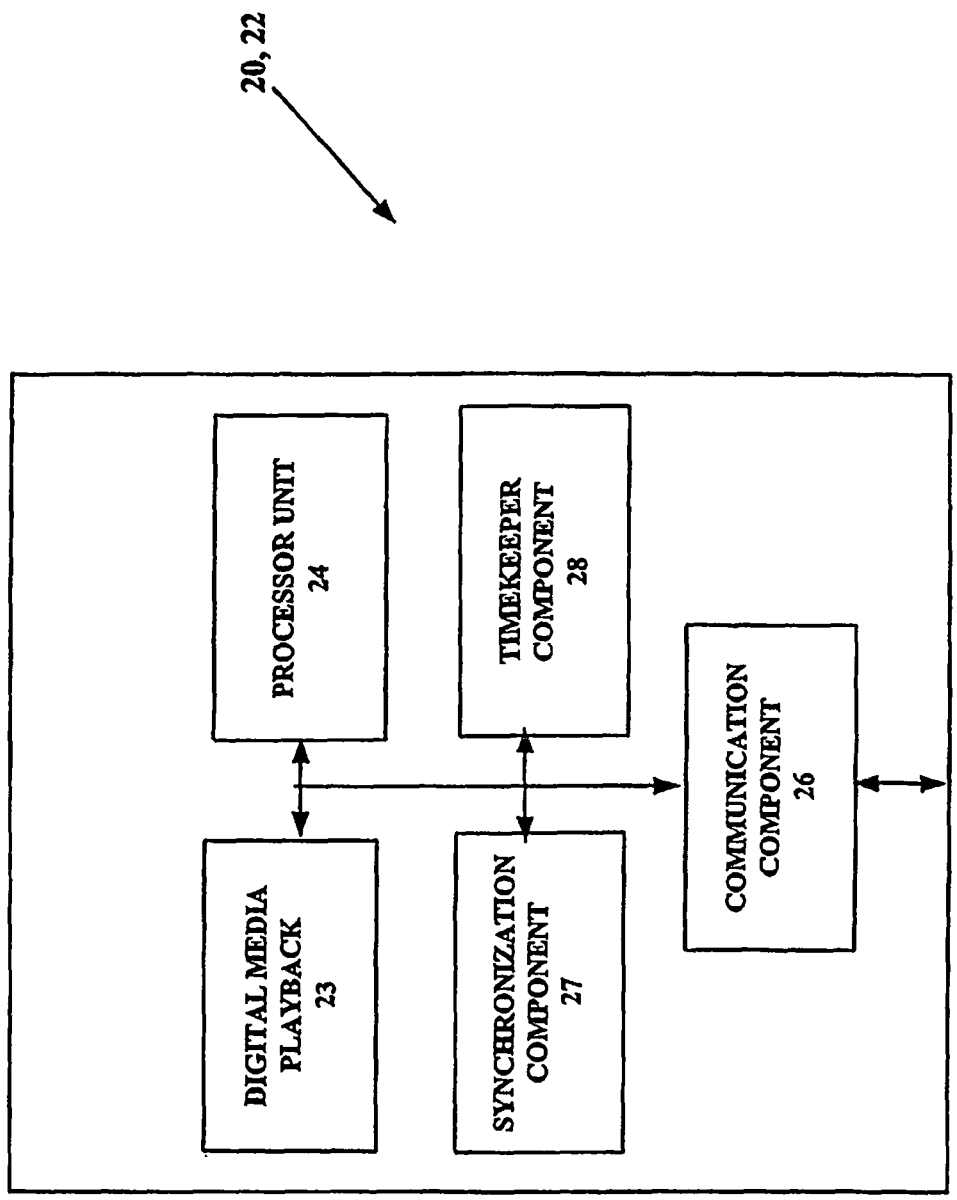

METHOD AND SYSTEM FOR SYNCHRONIZATION OF DIGITAL MEDIA PLAYBACK

CLAIM OF PRIORITY

This application is a divisional application under 35 U.S.C. §121 and claims the benefit of priority of U.S. patent application Ser. No. 11/155,002 filed on Jun. 15, 2005, now U.S. Pat. No. 8,190,680 and titled "Method and System for Synchronization of Digital Media Playback."

This application claims the benefit of priority under 35 U.S.C. §119(d) of U.S. Provisional Application No. 60/584,798, filed Jul. 1, 2004, and titled "Method and System for Synchronization of Digital Media Playback," which is hereby incorporated by reference in its entirety.

FIELD OF INVENTION

This invention generally relates to network systems comprising playback devices capable of playing pre-recorded or streaming digital media content. More specifically, the invention relates to methods and systems for synchronizing playback devices on the network, so that playback of the same digital media content from multiple devices appears to be concurrent to a user.

BACKGROUND OF THE INVENTION

With the advent of Home networking and Internet and PC based media, devices which play digital media content have become common. Transmission between an audio source and a playback device can be analog or digital. In such systems, synchronized playback of different devices at varied locations relies on a continuous stream of digital content, or an analog signal, being received simultaneously by multiple devices. For example, a whole-house audio system can have an amplifier, located in any convenient place, which simultaneously distributes analog signals to multiple speakers throughout the house. In an office environment, a telephone system may be used for paging. In such a system, the central telephone switch activates all handsets and sends an identical audio signal to them. Analog audiovisual signals transmitted to remote speakers and/or view screens from a single source typically are perceived as simultaneous or synchronized. The signals propagate at near-light speed whether traveling on a transmission line or in free space, so that all signals appear to arrive at the same time, over relatively short distances. However, this may not be true of digital signals transmitted as packets over a network.

Due to the cost of home networking equipment, and the proliferation of computer-based digital media, it has become common to locate standard Internet protocol (IP) based network devices throughout the home for playing a variety of digital media. However, due to the structure of such IP networks, the delivery time of information (e.g., a digital audio signal) from one device to another can vary over time. Thus, even a simultaneous broadcast from a single location may not reach the intended location, or locations, within a fixed or known period of time. The nature of switching and routing on an IP or other packet network is such that a data packet may be delayed in reaching a given destination, particularly in relation to the arrival time of other packets sent at almost the same time but to other devices. For example, some packets may be delayed because of network traffic, or because packets travel different network routes to the same location. Even a Promiscuous Mode Multicast may reach multiple destinations at different times because of delays introduced in packet switching and traffic on the network. Thus, even over short distances, playback may not be synchronized. Unlike analog signals, where a perceived delay is often primarily a function of physical distance, other factors may affect the transmission and perceived delay of a digital signal.

For example, a user walking from one room to another, where an audiovisual program is being sent to and rendered by different playback devices at different network nodes, may experience undesired, overlapping, or out-of-sync renditions of the same broadcast or programming. Conventional technology may use a cache or buffer to address gaps or lags in a single rendition of a program, but this does not solve the problem of synchronizing one or more renditions of a program at different network nodes, and indeed may compound this problem. To accommodate the playback of digital media content without gaps or lags, playback devices typically implement a "buffering" mechanism in which the playback device maintains sufficient data to account for any "lag" or delay in getting additional data. Uninterrupted playback is obtainable, even though individual parts of the data stream may arrive in an erratic manner.

Another exemplary method for providing guaranteed timely delivery of network packets involves modifying the hardware infrastructure of the network. Draft standard IEEE 802.11e proposes such an implementation by disclosing a modified network protocol for streaming delivery of digital media by assuring that data will arrive in sequence and within a given time frame. However, implementing this proposed protocol requires additional hardware and networking software upgrades to a system. IEEE 802.11e is hereby incorporated by reference in its entirety.

Audiovisual (A/V) or multimedia systems typically comprise a content source, one or more signals produced from that source, one or more paths or channels for the audio and/or video signals, and devices for rendering the signals, such as a display system and/or a speaker system. In today's multimedia systems, there may be more than one visual display, and typically there are multiple speakers for audio playback. For coordinated audiovisual playback in one location, audio and video are synchronized with each other by known means. For example, a digital audiovisual source, such as content stored on a CD or DVD, or on a hard drive, is accessed and the digital media is converted to an analog signal. The analog signal is delivered simultaneously to the display and to all of the connected speakers. Because these analog signals travel at near-light speeds over very short distances, e.g., through wires or as a wireless analog broadcast, the playback at the display and the speakers is perceived as simultaneous or "in sync." Additional analog displays and speakers can be added, for example in other rooms or locations, so long as additional wiring or wireless resources are available. Sight and sound are synchronized, e.g., between the displays and the speakers, by known means which account for differences in audio and visual rendering and perception. A/V synchronization in these systems does not depend on coordinating the speed or delivery time of the analog signal, which remains essentially the same throughout the system.

Synchronized playback and performance or rendition of audiovisual content can not be provided in this way over a digital, broadband or packet-switched network. Difficulties in achieving a synchronized playback among multiple playback devices on a heterogeneous network, comprised of devices with differing speeds and memory capacities, causes observable audio and video differences to exist between the outputs provided by the multiple playback devices. The nature of the IP network packet routing and timing, and conventional buffering mechanisms may add to the problem of providing simultaneous playback from two or more playback devices. What is needed in the art is an approach to synchronization which works within the framework of readily available network hardware and protocols, and without requiring changing the network hardware or network software. Further, missing from the art is a synchronization capability which allows multiple disparate networked media playback devices for the playback of both streaming real-time media, as well as pre-recorded media. The present invention can satisfy one or more of these needs.

The prior art has addressed network timing issues, but does not confront or provide solutions to the problem of synchronized playback at different nodes of a digital network.

U.S. Pat. No. 6,611,537 to Edens et al., issued Aug. 26, 2003 and is titled "Synchronous Network For Digital Media Streams" discloses a synchronous logical ring network which operates on existing twisted-pair telephone topologies. The network is comprised of consumer electronics devices including a DSS tuner which receives MPEG2 movie format, a multimedia PC, CD/DVD players, and broadcast FM receivers. Information propagates around the logical ring, reaching every device on each revolution around the ring. The patent discloses network devices that are full-duplex devices, i.e., transmitting and receiving information on every clock cycle. The network devices arbitrate to be elected the network data clock device; which is not a timekeeping device, but merely a regularly pulsed reference signal that synchronizes the reading of a data stream and is present in conjunction with the data stream. By synchronizing all network devices to the reference clock provided by a single device, and providing fixed frames of information at consistent time intervals, the Edens et al. patent discloses that information propagates at consistent intervals. Synchronization is achieved by the network clock device sending a synchronization marker at constant intervals to which all other devices synchronize. The fixed-length frames are divided into two independent streams; a data stream for distribution of real-time continuous digital media streams, and a system command stream.

U.S. Pat. No. 6,622,171 to Gupta et al., issued Sep. 16, 2003 and is titled "Multimedia Timeline Modification In Networked Client/Server Systems." This disclosure is directed to streaming multimedia content over a network system from a server computer to a client computer. The client allows a user to vary the speed at which the multimedia content is rendered at the client. Time-scale modification technology is used to maintain the original pitch of any audio content, thereby maintaining its intelligibility. The speed of the time-scale modification selected by the user alters the playback speed of the streaming multimedia content. While this improves the fidelity of playback on a single device operating at different speeds, it does not synchronize the playback of two or more devices.

U.S. Pat. No. 6,598,172 to VanDeusen et al., issued Jul. 22, 2003 and is titled "System and Method for Clock Skew Compensation Between Encoder and Decoder Clocks by Calculating Drift Metric, and Using it to Modify Time-Stamps of Data Packets." This patent discloses a computer system for encoding and decoding a series of data packets containing audio and/or video data. The patent discloses a method and a device compensating a clock skew, which can exist between the clock used by the encoder and the clock used by the decoder. The patent discloses that the decoder calculates a drift metric representing the clock skew and modifies the time-stamps of the data packets based on the drift metric. The number of audio and/or video packets waiting in a playback buffer is used to calculate a drift metric based on the growth or diminution of the queue. The decoder also adjusts the sample rate conversion to adjust the playback rate of the digital data. Each packet header includes time-stamp data representing presentation time. The time-stamp for both audio and video packets is modified using the drift metric in order to compensate for any differential in clock drift or clock skew between the encoding and decoding clocks. This modification maintains synchronization between the audio and video playback, i.e., lip sync.

All references and patents cited herein are hereby incorporated by reference, as if these references and patents were set forth in their entirety within this application.

Though dealing with network playback and timing issues, the prior art does not provide a system for rendition of a program by multiple playback devices in a manner that is perceived by the user to be synchronized or contemporaneous.

SUMMARY OF THE INVENTION

In accordance with a method which embodies the invention, timekeeper components of two or more digital media playback devices are synchronized. A first playback device or player initiates the synchronization by broadcasting a request to synchronize digital media playback to at least one other player. The initiating playback device determines a particular position in the media signal and a particular time-of-day when synchronized playback is to begin.

Differences in the time-of-day as tracked by a timekeeping component within each player undergoing synchronization are quantified. One process requests a time-stamp from a time server or an internal timekeeper component, and each playback device sets their internal time-of-day to this time-stamp. A second process performs predictive successive approximations of the time-of-day to predict when the content should arrive at the player and makes adjustments to the prediction based on feedback from the players being synchronized. A third process involves broadcasting to the players a series of signals at intervals, preferably the signals are at some predetermined and fixed interval. The time-of-day within the signals is adjusted according to feedback from the players being synchronized. The initiating playback device accounts for differences among the timekeeper components and instructs the players of the particular time when synchronized playback is to begin. All designated players then play the media from the indicated position at the indicated time so that playback of the digital media content appears to be sufficiently synchronized. This results in an audio and/or visual display that is acceptable to a human user of the system.

These and other aspects, features, and advantages can be further appreciated from the accompanying drawing Figures and description of certain illustrative embodiments.

BRIEF DESCRIPTION OF THE DRAWING FIGURES

FIG. 1b illustrates a playback device in accordance with an embodiment of the invention;

DEFINITIONS OF TERMS

Figure 1A:
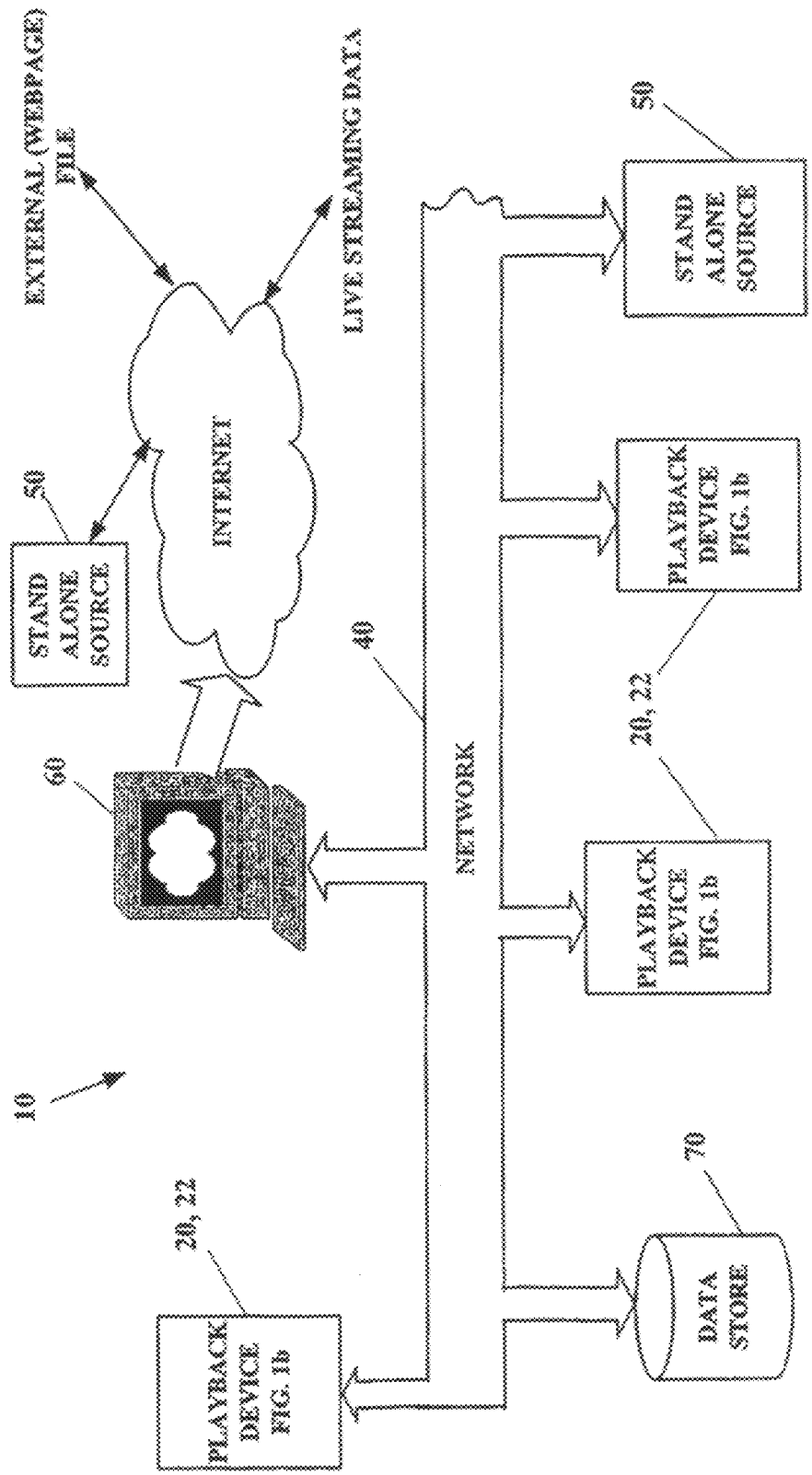
FIG. 1a is a system overview in accordance with an illustrated embodiment of the invention

The terms used in this specification generally have their ordinary meanings in the art, within the context of the invention, and in the specific context where each term is used. Certain terms are discussed below, or elsewhere in the specification, to provide additional guidance to the practitioner in describing the devices and methods of the invention and how to make and use them. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to the preferred embodiments.

"Playback device" and "player" mean an appliance that is capable of receiving, rendering, and optionally transmitting audio, video, or audiovisual data, including digital media.

"Audio," "video," "audiovisual data," "audiovisual media," "media content," and the like, mean any information in any analog or digital format which can be displayed, rendered or perceived in sight and/or sound, with or without any other accompanying information that is "hidden," i.e., not displayed, rendered or perceived. For example, "audiovisual data" includes both digital and/or analog media. Likewise, "content" also refers to the audiovisual data, with or without additional "hidden" information.

"Digital media" or a "digital signal" means any digital representation of an audio and/or video performance, of any content and in any format, with or without additional non-representational information, e.g., control information, and whether or not the digital media or signal is converted from or to an analog signal. Many digital media formats are known, including for example, MP3, MPEG, JPEG, TIFF, Real Media and Windows Media. Digital media may also be stored in any physical form, such as on a hard drive, in solid state memory, on a CD or DVD, tape, etc. The hard drive and memory can be stand-alone devices connectable to a network or a Personal Computer, or may be connectable or located in the Personal Computer itself.

Digital media (or a digital signal) may be converted to analog media (or an analog signal), e.g., for display, rendering and perception by a user. For example, an audiovisual presentation stored in a digital format may be converted to one or more analog signals for display of images and/or sound on an analog display device, such as a conventional television. Alternatively, a digital signal may be rendered on a digital display without conversion to an analog signal. Digital audio and visual media or signals may be rendered separately or together, with or without analog conversion. For example, digital video or images may be rendered on a digital display, while corresponding digital audio media or data is converted to an analog signal for playback by an analog speaker system. Methods for digital-to-analog conversion are known, as are methods to synchronize the audio and video portions of a signal during its playback.

"Analog media" or an "analog signal" means any analog representation of an audio and/or video performance, whether or not the analog media or signal is converted from or to digital data or a digital signal. Thus, an analog signal may optionally be captured and converted to digital media for storage and/or transmission to other devices for playback. For example, images from a digital camera, or audio from a telephone device, such as an IP telephone, may be converted from analog to digital signals by the camera or telephone, or by another device or process e.g., residing on a network.

DETAILED DESCRIPTION OF THE ILLUSTRATIVE EMBODIMENTS

By way of overview and introduction, methods and systems for synchronizing two or more digital media playback devices located on a network are presented. Synchronization permits the playback of the same digital media content by multiple players at different locations so as to be perceived by a human user as concurrent. The digital media content can be, for example, audio, video, or a combination thereof. Digital media content can be supplied from pre-recorded digital mediums such as a computer disc (hard drive or floppy), CD, DVD, or the like. Preferably, the pre-recorded digital media content resident or loaded into any player on the network is accessible to all digital playback devices on the network. Additionally, the digital media content can be in the form of streaming digital media supplied over the network. The format of the digital media can be provided in any suitable file format and/or communication protocol associated with these mediums. Embodiments providing for the synchronization of media content presented in these various formats are described below.

The playback devices or players can be capable of playing back from the same sources and media formats, or from differing sources and formats. In particular, one or more playback devices can play digital media content stored in a data store device accessible through the network. Alternately, the digital media playback devices can also play either analog media connected to the playback device (converting the analog signal to digital form for re-distribution), or digital media streams from an external source (streaming the media from one playback device to another).

FIG. 1a depicts an overview of the hardware components associated with one embodiment of the playback device synchronization system 10. System 10 comprises two or more digital media playback devices 20, 22 connected to a network 40. Each digital playback device 20, 22 contains components that enable the synchronization of the conventional digital playback technology. In another embodiment, system 10 further comprises a data store 70, a stand-alone source 50 (that provides digital media), and an Internet server 60 connected to the network.

FIG. 1b illustrates the functional blocks of a digital media playback device which is capable of implementing an embodiment of the invention. These functional blocks can be implemented in hardware or software, or a combination of hardware and software, as is known by a practitioner of ordinary skill in the art. The digital media playback devices 20, 22 ("player" or "players") comprise a digital media playback component 23 for playing back digital media content, a processor unit 24 for controlling the operation of the playback device, and a communication component 26 for communicating with the other devices connected to the network 40. Coupled to the network is a synchronization component 27, which can alternatively be part of, or comprised by, the processor unit 24 or the playback component 23. Synchronization component 27 operates to synchronize digital media playback by the player among the other playback devices being synchronized. Importantly, the playback devices 20, 22 each comprise a timekeeper component 28. The timekeeper component marks the time-of-day and is capable of measuring elapsed time. Additionally, the timekeeper component can further include an internal clock signal that is supplied for sequencing the operation of the playback device and its components.

The digital media playback component 23 portion of the playback device 20, 22 is implemented with conventional technology. The features of component 23 varies depending on the recorded media which it plays, e.g., DVD, CD, MPEG, MP3, audio or video tape, etc. System 10 can include one or more playback devices each including multiple playback components 23 capable of operating in more than one technology. In one embodiment of system 10, a video MPEG playback processor, a custom digital audio playback processor and a personal computer CPU can comprise the playback components of the playback devices.

To play back MPEG encoded data content, a subsystem implemented through hardware, software, or a combinations of hardware and software, can be employed to render the MPEG content for analog or digital display. To play from a DVD or CD, an optical reader in the form of a laser head is employed in component 23 to read information in the form of elongate elements of greater or lesser length located on an optical disc. Conversely for audio or video tape, information is stored in the form of magnetic pulses which is read from the tape as it passes in proximity to a magnetic head. The invention is not limited to the format or technology of the digital medium which stores and reads the digital content. Embodiments of the playback device 20, 22 can have a playback component 23 that is capable of playing from more than one media technology, e.g., both audio tape and CD, or MPEG in combination, or to play digital files stored on a local or remote data store, or streamed directly from either the Internet or on external device 50.

The processor component 24 acts as a system controller for the player and controls its operation. The processor is typically implemented as a single microprocessor or microcontroller with associated memory, program memory storage, working memory and interfaces. Alternatively, processor 24 can be implemented in a distributed architecture where more than one processor is used to control the player's functionality and these several processors can be located throughout the playback device.

Communication component 26 interfaces the player to the network and coordinates signal and data transfer among the devices. The coordination of messages between devices located on the network is controlled via network handshaking protocols implemented in the communication component. The communication component comprises a memory buffer that stores messages for processing and a processor having software along with associated memory and instruction sets. Alternatively, component 26 can be a software module which executes under the control of processor component 24.

The synchronization component 27 comprises software instructions and a processor with its associated memory, or alternatively, is a software module which executes under the control of processor component 24. The synchronization component 27 includes instruction sets for processes that embody the invention. These processes are described in detail below with reference to FIGS. 2-5*b*, but the following is presented as a brief introduction of certain features.

To synchronize playback among two or more players, an offset between each player's time-of-day measurement is determined relative to a single reference (e.g., a time-stamp from a time server, or the time-of-day of a designated player connected to the network). The synchronization component participates in the determination process, stores the offset, and applies the offset to the time-of-day of its playback device which is maintained within timekeeper component 28. A salient feature of the invention is the synchronization of two or more players.

In one embodiment, the synchronization unit receives messages, via communication component 26, defining a particular time and a particular position in the digital media content where synchronization is to begin. The particular time and the particular position in the media are determined by a first player which acts as an initiator in the process. The synchronization component participates in several processes which involve comparing the time-of-day being marked by each player's timekeeper component 28.

When a player's synchronization unit determines that the combination of an offset received from the first player and the player's own time-of-day is equal to the received particular time, it informs processor 24. Processor 24 then instructs the digital media playback component 23 to begin playback at the particular point in the media. The offset is applied to advance or retard a player's time-of-day to synchronize it with another player. If there is no difference between the time-of-day being marked by the players, then the offset is zero and the players are synchronized. Any playback device 20, 22 can act as the first player and in preferred embodiments can receive such a designation from a human user of the system.

In one embodiment, a first player initiates a clock synchronization process with at least a second player. Once the timekeeper components 28 of the players are synchronized, the first player informs the second player of its current time and current playback position within a digital media file stored on an external store. The second player then begins playback at some later position in the media file. This later position is computed to synchronize the first and second players based on a known fixed rate of the media stream and the synchronized player times.

The timekeeper component 28 tracks the time-of-day for the player. Timekeeping systems and methods are known, and can be implemented in hardware, or in software and hardware working together. The timekeeper component can be implemented in a counter which is initialized to the time-of-day and resets itself at twenty-four intervals. Alternatively, the counter simply counts from the time of system power-up. In one embodiment the timekeeper includes a free-running stable oscillator as its reference as well as counters and/or shift registers which are used to divide down the oscillator frequency as is known in the art. Alternatively, the reference for the timekeeper component can be the overall system clock for the player, so long as it is continuously running and available to the timekeeper.

In one embodiment, synchronization system 10 can have a synchronization controller (not shown) connected to the network 40 and operating to synchronize playback among the digital media playback devices 20, 22. The synchronization controller is not necessarily itself a playback device, but is capable of performing the functions associated with a first playback device acting as an initiator of the synchronization processes. Within the synchronization controller is a synchronization component, a timekeeper component and a communication component in communication with the network 40.

The timing of the delivery of digital media content in a network is variable in nature. Conventional playback devices typically compensate for this timing uncertainty by buffering the digital media content in memory to overcome any delay in receiving content across the network. So long as the quantity of buffered content is sufficient, there are no gaps in playback while waiting for new content to arrive at the device. These and other conventional playback methods may sufficiently address the continuity of playback, but are inadequate to provide coordinated and synchronous playback from two or more devices on a packet network. For example, independent buffers for each player are not coordinated or "in sync," nor does the prior art provide either a common buffer, or systems of cooperating buffers, to achieve synchronous playback.

In one embodiment, synchronized playback from multiple devices overcomes the problem of network uncertainty by operating independently of the timing of the digital content's arrival at the playback device. Conventional buffering techniques are improved upon, and synchronization and playback are permitted, even when network loading interferes with optimum network performance, or even when the network is not immediately available. In the event the network becomes temporarily unavailable to a playback device once two or more playback devices have established synchronous playback of a particular stream, each playback device can maintain synchronization with other synchronized devices by skipping ahead in the media. In other words, once a device is playing in sync with others, the current position within a playback stream at any given point in time can be easily re-established because playback occurs at a steady, known rate. A synchronized playback device calculates the elapsed time of network unavailability and begins or resumes play from a point in the media that corresponds to where the player would have been but for the loss of network connectivity.

Synchronized playback is provided by dynamic time-based synchronization, which allows media playback devices 20, 22 to align or synchronize each timekeeper component 28 with one another. This time-based synchronization solution compensates for the dynamic operating condition of the network and accounts for network loading. For example, alignment of timekeeping allows the media playback devices 20, 22 to begin independent playback of the media content at the same predetermined position in the media stream and at the same predetermined time.

Depending on the media format being played and/or the player environment (e.g., processor speed, network speed, available buffer size, etc.), different approaches are used in determining at what position in the digital media content, and at what time, the independent playback devices 20, 22 are to begin synchronization. By way of example, if the digital media content is resident on a data store 70, which is accessible to any player to be synchronized, a first player receives an external command (such as a user request), and in turn designates one or more other players to begin the synchronization process. The synchronization component of the first player then acts to synchronize the timekeeper component 28 of these other designated playback devices which are connected to the network. The first player provides timing information to the other playback devices and indicates what frames or sequences of the digital content are to be played at which time. The first player determines the particular time and the particular position in the media where synchronization is to occur by performing a Time Server Broadcast process, Predictive Successive Approximation process, or Fixed Interval Broadcast process, which are all described in detail below.

In an embodiment, the timing information provided by the first player includes information indicating which frames or sequences of the digital content are currently being played by the first player, together with the first player's time-stamp information. Applying the first player's time-stamp information in conjunction with the steady rate of playback, which is known, allows other playback devices to calculate at what frame or sequence in the digital content to commence playback.

For example, a first player is currently playing a movie at a playback rate of 60 frames per second, and is commanded to cause a second player to synchronize with it. The first player determines the initialization time required by the second player (e.g., 10 seconds) by obtaining information from the second player or from a database containing information about all players on the network. The database can be located anywhere on the network, e.g., in the data store 70, or resident locally at the players. The first player also determines the second player's system time (its internal time-of-day) and instructs the second player to commence playback at a frame 600 frames advanced from the current position of playback at the first player, and at a time 10 seconds from the established current time on the second system. Methods which can determine the second player's system time are described below. A simple approach can be embodied in a process where a first player transmits its start-of-media-playback time, and a second player can determine where and when to begin playback.

In an embodiment where the digital media is being streamed in live fashion, i.e., available to devices on the network only while it is being transmitted, such media needs to contain "markers" to assist the various players in identifying a fixed position within the stream. Such markers may be imbedded in the media, or may be inserted by a "managing" playback device (i.e., an Initiator) which receives the live stream, marks it, and then re-broadcasts the stream locally to the other playback devices on the network. For the embodiment where the managing playback device is originating the live stream, the markers are embedded by the managing playback device as the stream is being broadcast.

To synchronize with a "live" or streaming broadcast available from a source external to the network, a first playback device delays or buffers the playback packets or "signal," and then sends or re-broadcasts the signal to other devices commanded to play the same content. The first player adds position indicators (e.g., markers) to the data stream to establish identifiable fixed points in the signal stream.

The markers can be simple numeric counters placed in the stream at fixed intervals. Such markers permit playback devices to determine positions within the media stream. One embodiment of a method that uses the embeded markers involves a first playback device broadcasting a message which notifies other playback devices that the first device played position marker X at time $t_x$. From this information other playback devices can calculate a synchronization time $t_x+N$, and a marker position, X+M, where N is a time differential, and M is calculated from the playback rate and the predetermined, known intervals between markers.

The first player indicates to the other players what particular fixed point in the stream it will be playing at some predictable future time. To synchronize with the first player, the other players commence playback at that particular fixed position in the stream at that particular future time. Before indicating a particular future start time, the timekeeping components of the players are synchronized by the methods described below.

The first player preferably commences transmitting the contents of its own buffer and, where possible, expedites streaming from the external source to better enable synchronization, thus assuring a sufficient supply of digital content at the other playback devices for commencement of synchronized playback. If the streaming data does not contain any markers relative to a fixed ascertainable starting point, it is necessary to buffer the streaming data and delay its playback to allow players receiving the re-transmitted stream to accumulate data in their buffers.

However, if the playback rate is sufficiently slow relative to the network response time, playback can commence and continue while accumulation in the buffer is underway. This technique is viable when the buffering at the re-transmission point and the delay it adds in order for other players to catch up, relative to the connection and playback speeds does not create any interruptions, i.e., skips, hiccups, or the like.

A first player determines a particular fixed position in the media stream or content, and a particular future time where synchronization is to begin. The first player then informs the other players to commence playback at that particular position and at that particular time.

Synchronization among the devices on the network is improved if the network transmission time is included in the determination performed by the first device. Methods for determining the transmission time between two network nodes are well known. Two common approaches are "ping" and "traceroute." Both ping and traceroute are computer program commands that test network interconnectivity, and are known to persons of ordinary skill in the art. Ping provides a low-level test of the connectivity of a network by sending a small packet over the network to a host. If the host receives the packet, it returns a response to the sender. The ping command is described, for example, in U.S. Pat. No. 6,215,774 to Knauerhase, et al., issued Apr. 10, 2001. The trace route command is described, for example in U.S. Pat. No. 6,300,863 to Cotichini, et al., issued Oct. 9, 2001. U.S. Pat. Nos. 6,215,774 and 6,300,863 are hereby incorporated by reference in their entirety.

A ping command causes a host to send one or more packets to a destination site. Upon receipt, the destination site reverses the addresses and sends the packet back to the sender. The roundtrip elapsed time is measured, which is a measurement of the time it takes for the ping packet to travel from the sender to the desired end point and then back to the sender. The one-way travel time is derived from the ping packet's round-trip elapsed time. The time for a one-way trip from transmission site until receipt of a packet may on average be generally half the round trip time. However, this may not be true where the routing is asymmetric—e.g., in instances where the packet travels a different path in one direction than another.

Travel time via asymmetric routing can be more accurately quantified by the traceroute program, which sends multiple packets toward a destination. Traceroute records the route that the network inter-connections provide for the packets. The packets on a network move from sender to destination by traveling segments of the network between intermediate routers. Each segment is referred to as a hop. Traceroute tags each one of the multiple packets with a different "time-to-live" header field. The varying timeouts cause the packets to expire before reaching the final destination, and are returned to the sender. For example, one packet returns after 1 hop, another after 2 hops, a third after 3 hops, and others after 4, 5, and 6 hops. At least one other packet reaches the destination and returns. Through this method the trail that packets take over the network can be determined. The trail will indicate if there is a different path taken for a return-trip signal, and from this information any time from asymmetric routing can be taken into account, in order to determine a prediction of the elapsed one-way time calculation.

The synchronization of a timekeeper component is not dependent on what method is used to measure transmission time, and can be implemented with any method. Preferred embodiments rely on ping or traceroute. The calculated network transmission time between devices is used when synchronizing the playback devices. Briefly, the calculated network transmission time is used to offset time-of-day messages sent between devices undergoing the synchronization embodiments described in detail below.

Figure 2:
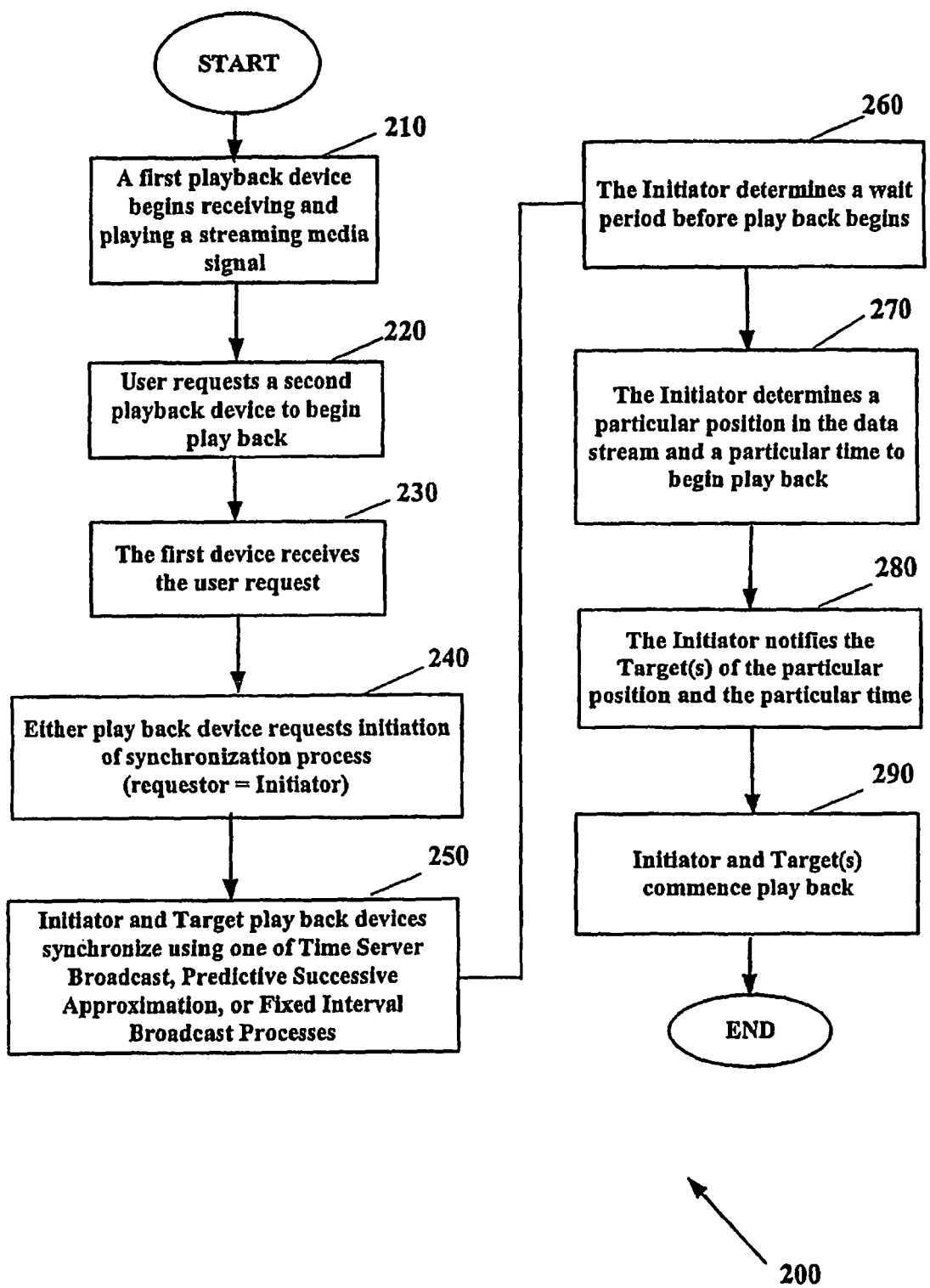
FIG. 2 is a flow diagram illustrating steps in accordance with an embodiment of the invention.

FIG. 2 illustrates Process 200 which embodies a method in accordance with the invention. Process 200 depicts a method for synchronizing digital media playback devices 20, 22. At step 210 a first digital media playback device begins to receive and playback a streaming digital media signal. Although this discussion presents an embodiment which receives a streaming content from a source external to the network, the invention is not so limited. As is known in the art, the digital media signal can also originate from a pre-recorded format local to the network, and being played back by a digital media playback device 20, 22 or a stand-alone source 50. The content from the pre-recorded format can then be copied, transmitted or streamed to other playback devices on the network.

A user of the system wishing to have a second playback device 20, 22 sync to the first playback device and play the same content makes a request, step 220, to any player device to have it sync with any other one or more players. Media playback of the players is synchronized so that monitors and/or speakers (not shown) attached to, or directed by, each of the playback devices appear to the user to be playing the content simultaneously.

For example, a user may request a first playback device to send the digital content being received by a second playback device, or the second playback device can receive a user request to send the content being received by a first playback device.

At step 230, the first playback device receives a user request for a second playback device to render the digital media content being received by the first playback device. Optionally, a user can designate two or more playback devices 20, 22 that are desired to be placed in sync with the first playback device. In another embodiment, prior to any playback the user may designate that playback of media commence simultaneously from several devices.

The synchronization process can be initiated by at a user's request via any playback device, and any of the playback devices on the network can be synchronized. Additionally, a user can designate additional playback devices to be added to the synchronization process even after synchronized playback begins. Solely for illustrative purposes, the following discussion is based on a synchronization request initiated by the first playback device.

The user designates any playback device coupled to the network as a first playback device which initiates the synchronization process. At step 240, the first playback device initiates the process by requesting that the second playback device synchronize its timekeeper component 28 with the first playback device timekeeping component. Preferably, the actual time-of-day for the playback devices does not change. Rather, the synchronization components 29 of the playback devices are supplied with instructions which are used to synchronize playback at a particular position in the media stream, and at a particular time. For certain embodiments the instructions include offsets to adjust the time-of-day tracked by the timekeeping component of a particular player and are determined by implementation of at least one of three processes—Time Server Broadcast, Predictive Successive Approximation, or Fixed Interval Broadcast. These offsets, or relative time differences between each player and any other player, can be maintained in a database anywhere on the network or in the datastore 70.

The device which requests that synchronization be initiated is hereinafter referred to as the Initiator or the Initiating system and the players which are being synchronized are hereinafter referred to as the Target(s). There are no other necessary distinctions between Initiator and Target, and any digital media playback device 20, 22 can be either. At step 250, the Initiator and Target playback devices synchronize their timekeeper component by using one of the following processes: Time Server Broadcast, Predictive Successive Approximation, or Fixed Interval Broadcast. The algorithms for each of these processes is described below with respect to FIGS. 3, 4 and 5a-5b.

After performing the synchronization process, the offsets are known and the Initiator is able to determine an appropriate interval after which playback synchronization can commence, step 260. The determination is predicated on various parameters and characteristics (e.g., network speed, buffer size of the target, and hardware startup delays or any other inherent delays associated with the Initiator or Target(s)). The interval determination can rely on a direct request for such information from the Target, a search of a database containing these parameters and characteristics, or other methods as are known in the art. Once the Initiator determines an appropriate delay, at step 270, the Initiator determines the particular position in the media content where the Initiator will be begin its playing after waiting for the delay to expire. The Initiator notifies the Target to begin playing the data at the particular position and particular time, step 280, where the Target's time-of-day is offset or adjusted to reflect the particular time determined during the synchronization process performed at step 250. Playback of the digital media content is then commenced, step 290, by the Initiator and Target(s) at about the same moment, in such a manner as to present no perceptible differences to a human user of the invention. Once synchronized playback is begun, a player which loses sync can re-sync itself by continuing playback at a position in the media which is offset from the position in the media where sync was lost; this position can be derived from the time that has elapsed since sync was lost.

In one embodiment, the Initiator does not compute the startup delay interval, but instead supplies the Target with a particular position in the media content, preferably the position currently being played by the Initiator, along with an indication of the Initiator's time-of-day at which the particular position was, is, or will be played and the constant rate of media playback. Using the constant rate of media playback, the Target applies the time-difference between the Initiator's offset-adjusted time-of-day and the Target's time-of-day to predict a particular position in the media content at which the Target can sync playback. Preferably, the particular position is calculated so as to sync the Target as soon as possible after the Target receives the instruction to sync.

In a preferred embodiment, synchronization is optimized to account for playback timing differences between the players which affect video perception by a user. It is known by persons of ordinary skill in the art that the human eye has a persistence of vision. The brain or retina retains an image for a split second, even after that image has changed. This theory accounts for the fact that when a progressive series of moving images is projected, the mind sees the illusion of a motion picture. Video system recording speeds are equated to film shutter rates of 25 or 29.7 frames-per-second. To eliminate flicker between two playback devices 20, 22, the devices are preferably synchronized to be playing back the same or about the same digital frame at the same, or about the same time. Accordingly, the devices are preferably synchronized to within at least or about $\frac{1}{30}$ of a second.

In another embodiment, synchronization is optimized to account for multitasking and other factors that affect the goal of starting playback at a particular position and at the desired particular time-of-day. Typically, audio or video playback proceeds at a constant rate from the time of the first frame or data sample. Therefore, to achieve synchronization at a particular time, the initial frame or sample is required to start playing synchronously with the desired time-of-day. Several factors can affect the ability of the playback process to begin perfectly synchronous playback. These factors can include the multitasking behavior of the operating system, which may interrupt the playback process during a critical timing phase to prevent playback from occurring synchronously. Other factors include mode switching, driver synchronization, and other operating system delays which can occur between the time the playback process requests playback to commence, and the time it actually does so.

To account for multitasking delay, this embodiment adjusts the priority of the playback process to prevent the process from being preempted, and optionally uses critical sections or operating system synchronization objects to prevent other code from executing. Optionally, hardware interrupts can be disabled to prevent device code from preempting the process. During this interrupt disabled phase, a preferred embodiment causes the playback processes to idle in a tight loop while monitoring a hardware clock oscillating at a fixed frequency to determine when the desired time-of-day has been reached.

To account for mode switching, operating system, or driver delays, the data comprising one or more of the initial frames or samples is preloaded into the playback device or driver, using a mode of the playback device or driver that prevents the preloaded data from being played back until the playback mode is selected. After the initial frames or samples are preloaded in this fashion, the playback mode is selected using the methods described above, so that the interval between the time the mode change is requested, and the time that playback actually commences is of a fixed measurable duration. The fixed measurable duration is used to offset the time-of-day desired so that playback commences at or about the time-of-day desired.

The following section discusses three embodiments of the synchronization process. These embodiments are the Time Server Broadcast Process, the Predictive Successive Approximation Process and the Fixed Interval Broadcast Process. Each is described with respect to the respective Figure which illustrates the process.

Time Server Broadcast

Figure 3:
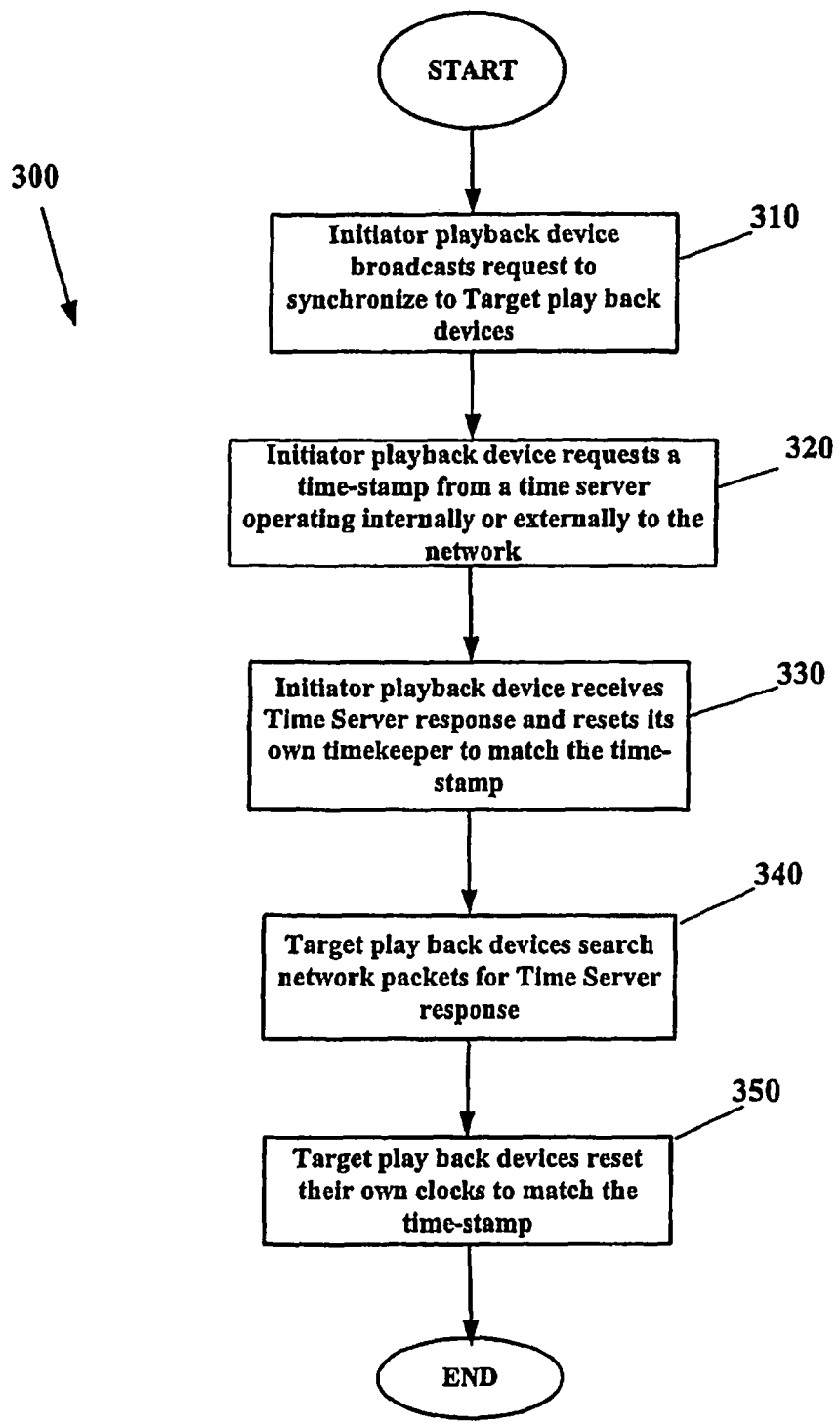
FIG. 3 is a flow diagram illustrating an embodiment of a time server broadcast process.

FIG. 3 depicts an embodiment of the Time Server Broadcast Process 300. At step 310, the Initiator playback device broadcasts a request to synchronize to the Target playback devices. Process 300 synchronization is based on a time-stamp received from a time server source that can be external to the network. External time servers are available over the Internet; one such time server is available at www.time.nist.gov. In an alternative embodiment, the Initiator itself acts as the time server by broadcasting its own internal time-of-day to the Target or any PC (acting as a playback device) on the network. In this alternative embodiment the Initiator's time-stamp provides a relative time reference to which the other devices can synchronize. At step 320, the Initiator device requests the time-stamp from the time server. When the Initiator device receives the time-stamp, at step 330, its synchronization component 27 aligns its timekeeper component 28 to the time-stamp. After being alerted at step 310 to the initiation of Process 300 by the Initiator, each Target device searches the network, step 340, for packets containing the time-stamp response from the time server. Once the Target locates and receives the time-stamp, at step 350, it sets its synchronization component and aligns its timekeeper component to match the time-stamp. The target aligns its timekeeper component by computing an adjustment to offset its time-of-day.

Because the packet from the Time Server is likely to reach all playback devices 20, 22 in a given branch of a small network at approximately the same time, Process 300 allows rough synchronization of the various playback devices, which may be satisfactory for synchronization of playback in different parts of a home. Using this method, synchronization accuracy will depend on a roughly equal processing speed for the synchronized devices and a minimal difference in network distance between the nodes where the devices connect to the network. This method may be less desirable in situations where either of these conditions varies largely, or if significant traffic on the network delays receipt of the time packet to one or more parts of the network relative to others. However, Process 300 has the advantage of being simple to implement for situations where more precise synchronization is not needed.

Predictive Successive Approximation

Figure 4:
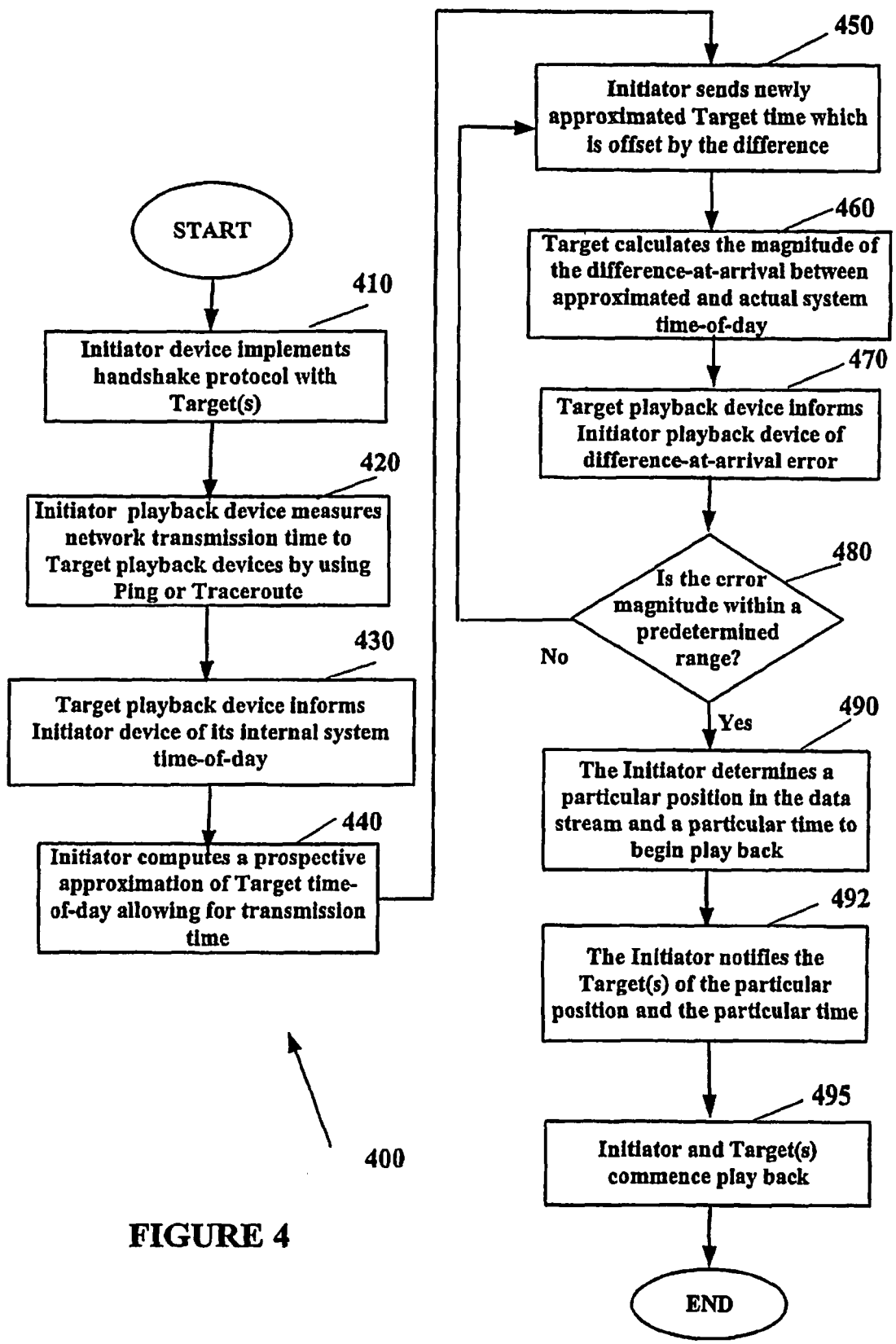
FIG. 4 is a flow diagram illustrating an embodiment of a predictive successive approximation process.
Figure 5A:
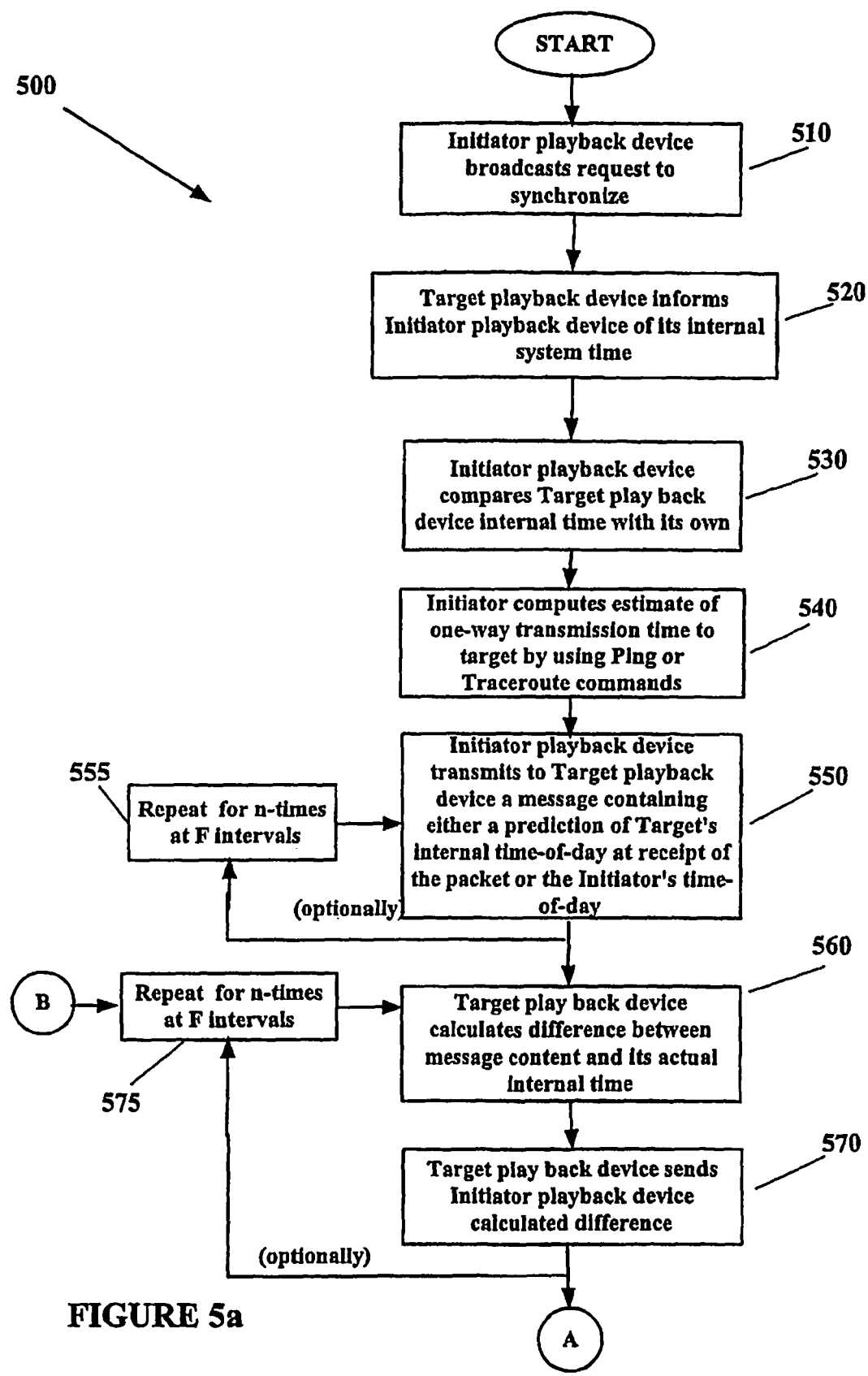
FIGS. 5a and 5b are flow diagrams illustrating an embodiment of a fixed interval broadcast process.
Figure 5B:
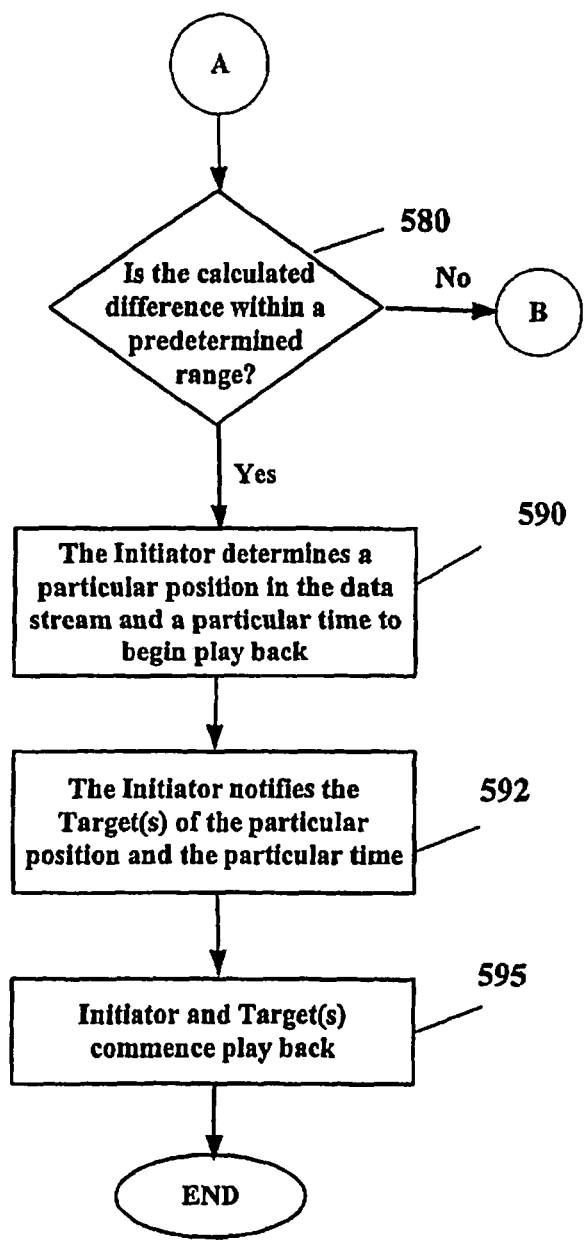

FIG. 4 illustrates an embodiment of the Predictive Successive Approximation Process 400. In this method two or more playback devices 20, 22 on network 40 are synchronized by the Initiator predicting the time-of-day of each Target(s). By implementing a handshake protocol the Initiator attempts through successive predictive estimates to determine the time-of-day as tracked in each Target's timekeeper component 28. The Initiator achieves synchronization by providing to a Target a predictive estimate of the Target's internal time-of-day, receiving back from the Target the difference between the Target's time and the estimate, and repetitively re-calculating and resending a revised estimate to the Target, so as to successively narrow the difference between the estimate and the time-of-day being tracked by the Target's timekeeping component. The estimate is a prospective prediction of the Target's time-of-day, meaning it is a forecast of time-of-day at its arrival at the Target. In one embodiment, the predictive estimate can be offset by the duration of the network transmission time. Offsetting the estimate in such a manner reduces the number of iterations necessary to arrive at an estimate that is within a predetermined range.

At step 410, the Initiator begins Process 400 by implementing a handshake protocol with the Target(s). The particular handshake protocol is conventional. The protocol itself is a set of formal rules describing how to transmit data across a network. Low level protocols define the electrical and physical standards to be observed, bit- and byte-ordering and the transmission and error detection and correction of the bit stream. High level protocols deal with the data formats, message syntax, character sets, sequencing of messages, etc. Handshaking refers to predetermined hardware and/or software activity designed to establish or maintain two devices in communication and often concerns the exchange of messages or packets of data. A simple handshaking protocol involves the receiver sending a message of its availability to receive more messages, while a more complex handshaking protocol has the sender asking the receiver if it is ready to receive, or asking for the receiver to reply to a message, e.g., indicating that the data was corrupted en route.

Referring to FIG. 4, at step 420 the synchronization component of the Initiator computes the network transmission time from the Initiator to the Target(s). As previously described, the transmission time can be determined by ping or traceroute commands. The ping command operates by transmitting one or more "pings" between two devices, here the Initiator and the Target. Such pings may comprise, for example, ICMP (Internet Control Message Protocol) echo requests. The ICMP echo technique is described in Douglas E. Corner, Internetworking with TCP/IP Vol. 1: Principles, Protocols, and Architecture 127 (3d ed., Prentice-Hall 1995). (Which is hereby incorporated by reference in its entirety.) As is known in the art, when the second device receives one of these pings, it will immediately transmit a responsive ping back to the first device. As described above, the roundtrip elapsed time is measured, which is a measurement of the time it takes for the ping packet to travel from the sender to the desired end point and then back to the sender (assuming symmetric paths). The one-way travel time can be derived from the ping packet's round-trip elapsed time. Increasing the number or frequency of pings in an iterative process will generally result in a more accurate determination of the transit time, e.g., as a mean or average of successive ping elapsed times.

For an exemplary embodiment using the ping command, processing begins with the first device transmitting a ping, such as an ICMP echo request, to the second device. The first device may record the system time at which the ping is sent. As noted above, the ping is of such a nature that the second device receiving the ping will transmit a responsive ping back to the first device. Upon receipt of the responsive ping, the first device may compare the current system time to the previously-recorded system time to determine the period of time which passed between transmission of the original ping and receipt of the responsive ping. The source device may then use this time period to derive a measure of transit time for communications between the first device and the second device, for example, the one-way time may be estimated as half the round-trip time.

The traceroute routine operates within a network and provides the network links which interconnect network devices. Network routers read the numerical destination address of an IP packet sent by any network device and decrease the time-to-live (TTL) field (used to age a packet) of the packet before sending it to the next appropriate router. However, if the TTL field is zero, the router will return the packet to the source device with a fail error code.

A traceroute is performed by doing multiple pings from a first network device to a second network device, e.g., the Initiator and the Target playback devices. The TTL field is incremented from one for each ping. The first ping is sent with a TTL value of one. It will fail at the first router and the first router address will be determined since the IP packet, now indicating the address of the first router, will be returned to the source device. The second ping will then be sent with a TTL value of two. If this call fails then the second router address will be determined. This process is continued until the ping succeeds in reaching its desired final destination (i.e., the Target device) before the TTL value times out. By saving each router address and the time of the TTL time-out, a trail of routers linking the first device with the second device is created. This route, representing the sequence of network communication links between the first and second devices can be analyzed to determine the forward and return paths for each packet and their return time, and, thus, any time differences can be found.

Referring again to FIG. 4, at step 430, each Target device undergoing synchronization sends the Initiator a data packet listing the Target's internal time-of-day as marked by the timekeeper component within the Target. Because of network considerations, irregular time elapses are incurred while the packet travels between each Target and the Initiator. Thus, when received at the Initiator, there may be some determinable difference between the time reported by each Target in step 420.

At step 440, the Initiator's synchronization component 27 computes an approximation of the Target time-of-day. This approximation is a prospective estimate of what the Target time will be when the Target receives a packet containing this estimate. The estimate can include an adjustment for the transmission time measured in step 420. At step 450, the Initiator sends the now adjusted approximation of the Target time back to the Target. The goal is to have the Initiator approximate the time that a packet arrives at the Target (a receipt-of-message time), and include that time in the packet it sends to the Target. At step 460, the Target reads the packet and calculates the magnitude of any error between the Initiator's approximation of the Target time, and the actual time reported by the timekeeper component of the Target. The Target informs the Initiator, at step 470, of this time difference-at-arrival. At step 480 the time difference is evaluated and if it is outside a predetermined range, steps 450-480 are reiteratively repeated, until the actual and predicted times are in reasonable agreement, i.e., are within a predetermined range of difference. Preferably, the time difference-at-arrival is within the lesser of 10% of the transit time or 10 msec.

Because the transfer delay will be somewhat different each time a signal is sent, an approximation containing only the expected time-of-receipt of the package may be insufficient for precise synchronization. This is because a seemingly "correct" approximation may occur due to a change in the transmission delay. Thus, for a more accurate synchronization, several matches need to occur to gain a high enough degree of confidence in the accuracy of the approximation. At step 490, the Initiator determines a particular position in the data signal and a particular time to begin synchronized playback. The Initiator notifies, step 492, Target systems of the point and time to begin synchronization Once synchronization is achieved, the devices play independently, step 495, after the first "sync and start." Once a "sync point" is established re-synchronization is preferably not needed, because the media playback rate is the same at all playback locations. Thus, even if a player "loses" data it can independently re-establish synchronized playback by using the elapsed time and media playback rate (both known to the device) to skip forward in the media. In such an embodiment, the media preferably arrives faster than the device can play, or the media is appropriately buffered, else the media will not play properly. Should a user send a request for either player to pause, resume, or playback at a different rate or direction (e.g., scan forward or reverse), the re-synchronization operation described above can be performed.

In another embodiment, the predetermined range of step 480 is selectable by the user and is dependent on the actual physical layout and location of the playback devices 20, 22. If the playback devices are at different ends of a large room and audio content is being synchronized, one may want to introduce a "negative delay" (i.e., a relative advancement of playback) adjusting for the time it takes sound to travel from one end of the room to the other. Alternatively for the same room, if one is synchronizing video, one may wish to make differences imperceptible visually, tolerating a resulting audio "echo" effect. Another alternative is to synchronize the video precisely, and synchronize the audio independently to compensate for an echo effect. The acoustics of the environment also play a role. The user's ability to perceive differences between the synchronized playback devices may depend on the media content and physical surroundings, therefore, the predetermined range is preferably user adjustable to account for particular circumstances. For the condition where the user has designated multiple playback devices, these steps are repeated for each playback device.

Fixed Interval Broadcast

FIG. 5 illustrates an embodiment of the Fixed Interval Broadcast Process 500. During Process 500, an Initiator computes the average network transmission time to the Target using the ping or traceroute commands. The Initiator then repetitively broadcasts a prediction of the Target's internal time-of-day to the Target. In one embodiment these broadcasts are done at successive predetermined intervals stored within a database that is typically located in the data store 70. If Process 500 is implemented with a predetermined, fixed interval between broadcasts from the Initiator to the Target, then the actual data content of the broadcast is not relevant for accomplishing synchronization. Alternatively, where the interval is not predetermined and stored, the interval can be designated by a user. The data content of the broadcast is then relevant to accomplishing synchronization and contains the Initiator's time-of-day at broadcast as stated above. Even for fixed intervals, the length of the message can be unknown to the recipient, thus, the message content becomes relevant. Whether broadcast at predetermined, fixed intervals or at user designated indeterminate intervals, either type of broadcast provides information sufficient to derive, by calculation, a measure of the variability of transmission times to the players being synchronized. These transmission time differences can be calculated because both the transmission delay and the start of transmission time are known.

For a succession of packets broadcasted at a fixed time interval between packets (F), their arrival at a destination will be received at intervals of a minimum of F−m and a maximum of F+x, where the ranges for m and x are network dependent, the absolute maximum variability of transmission times can be established as m+x. The maximum variability (m+x) is calculated by the Target and returned to the Initiator. The variables m and x can represent sets of parameters where m represents parameters that advance the reception of a packet, and x represents parameters which delay the reception of a packet.

In accordance with this embodiment, at step 510, the Initiator broadcasts a request to synchronize to the Target. The Target responds at step 520 by informing the Initiator of its internal time. At step 530, the Initiator compares the Target internal time with the time as tracked by the Initiator's own timekeeper component 28. At step 540, the one-way network transmission time is measured by the Initiator using any known method, e.g., ping or traceroute. The Initiator approximates a prediction of the receipt-of-message time (i.e., a predictive estimate of the Target time-of-day at the receipt of the packet) which the Initiator sends to the Target at step 550. In one embodiment, Process 500 continues to step 555, where step 550 is repeated for a predetermined number of times 'n' at the predetermined time interval F.

Whether directly from step 550, or after the passage of interval F at step 555, Process 500 continues to step 560 where the Target calculates the difference-at-arrival between the approximations received from the Initiator and the internal time as known by the Target timekeeper component 28. At step 570, the Target informs the Initiator of the difference calculated in step 560. In an alternative embodiment, Process 500 can continue to step 575, where steps 560 and 570 are repeated for a selectable number of times 'n' at a predetermined interval of time F.

Because Process 500 either sends a signal at fixed predetermined intervals, or sends a signal at intervals designated by a user, any variability in the transmission time between the Initiator and each Target playback device can be reduced, i.e., playback synchronization can be adjusted to account for network transmission time differences. Sources of a system-dependent minimum error can be, for example, the speed at which the system can respond to a network packet—e.g., the transit time of a packet from the network hardware to the time computation software, and the quantity and type of processes running in the system.

The magnitude of the system-dependent minimum error is inversely proportional to the system speed. For example, the skew in transmitting and receiving data at different nodes on the network is correlated to the network data clock pulse rate. The higher the network data clock frequency, the less time there is per clock pulse. Thus, for a system where the skew has an identifiable number of pulses, a system with a higher clock rate will have less of an error than a slower system. The system dependent error can be determined empirically for each system configuration. The number of repetitions 'n' is based on either the highest value required by any device on the network, or preferably, repeated until an acceptable minimum time difference is reached or a timeout condition occurs. It is acceptable for the value of 'n' to vary based on the magnitude of the system dependent error, but this is a design decision determinable from how accurate the synchronization needs to be for a given system and user. Once the values for the timekeeping components of the players to be synchronized are sufficiently known, the Initiator determines, step 580, the particular position in the data signal and the particular time at which synchronized playback is to commence.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one described embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

We claim:

1. A method for synchronizing digital media playback among multiple digital media playback devices on a network, each digital media playback device on the network being capable of initiating a synchronized playback, the method comprising, at a first digital media playback device:

receiving a user request at the first digital media playback device to synchronously playback digital media content with a second digital media playback device;

initiating a time synchronization with the second digital media playback device, said initiating including:

obtaining a time stamp from a time server over a network;

adjust an internal time of the first digital media playback device to match the time stamp;

enabling the second digital media playback device to obtain the time stamp over the network and to adjust an internal time thereof to match the time stamp based on a first message transmitted from the first digital media playback device; and determining a particular time, accounting for one or more network inherent delays, to commence synchronized playback by the first and second media playback devices;

providing to the second digital media playback device a particular position point in the digital media content and the determined particular time relative to the time stamp; and enabling playback of the digital media content by the second digital media playback device at the particular position point and at the particular time relative to the time stamp based on a second message transmitted from the first digital media playback device, said playback of the digital media content being synchronized with the playback of the digital media content at the first digital media playback device.

2. The method of claim 1, wherein said first media playback device is the time server.

3. The method of claim 1, wherein the network inherent delays include at least one of initialization time, network response time, transmission time between network nodes, buffer size, and transmission delays.

4. The method of claim 1, wherein the digital media-content comprises a live streaming media signal received from a source external to the network; and wherein the first digital media playback device inserts markers into the live streaming media signal.

5. The method of claim 1, further comprising the steps of: controlling at least one digital media playback device through a computer operating system; and adjusting a priority of the synchronized playback until the particular time has been reached; wherein adjusting the priority prevents the synchronized playback from being pre-empted.

6. The method of claim 5, wherein the adjusting step is performed by a user.

7. The method of claim 1, further comprising the steps of: controlling at least one digital media playback device through a computer operating system; requesting the at least one digital media playback device to pause playback; loading a portion of the digital media content commencing at the particular position point into buffers in the at least one digital media playback device; and requesting the at least one digital media playback device to resume playback.

8. A non-transitory computer-readable medium comprising: logic instructions executable by a first digital media playback device for synchronizing digital media playback among multiple digital media playback devices on a network, each digital media playback device on the network being capable of initiating a synchronized playback, wherein said logic instructions, when executed:

receive a user request at the first digital media playback device to synchronously playback digital media content with a second digital media playback device;

initiate a time synchronization with the second digital media playback device, said initiating including:

obtaining a time stamp from a time server over a network;

adjust an internal time of the first digital media playback device to match the time stamp;

enabling the second digital media playback device to obtain the time stamp over the network and to adjust an internal time thereof to match the time stamp based on a first message transmitted from the first digital media playback device; and determining a particular time, accounting for one or more network inherent delays, to commence synchronized playback by the first and second digital media playback devices;

provide to the second digital media playback device a particular position point in the digital media content and the determined particular time relative to the time stamp; and enable playback of the digital media content by the second digital media playback device at the particular position point and at the particular time relative to the time stamp based on a second message transmitted from the first digital media playback device, said playback of the digital media content being synchronized with the playback of the digital media content at the first digital media playback device.

9. The computer-readable medium of claim 8, wherein said first media playback device is the time server.

10. The computer-readable medium of claim 8, wherein the network inherent delays include at least one of initialization time, network response time, transmission time between network nodes, buffer size, and transmission delays.

* * * * *